(12) United States Patent
Donovan et al.

(10) Patent No.: US 11,652,254 B2
(45) Date of Patent: May 16, 2023

(54) SYSTEM AND METHOD FOR HIGH ENERGY DENSITY BATTERY MODULE

(71) Applicant: BETA AIR, LLC, South burlington, VT (US)

(72) Inventors: Sean Richard Donovan, Richmond, VT (US); Raffaello Verna, Creedmoor, NC (US); Herman Wiegman, Essex Junction, VT (US); Braedon Andrew Lohe, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 235 days.

(21) Appl. No.: 16/948,140

(22) Filed: Sep. 4, 2020

(65) Prior Publication Data
US 2022/0077442 A1    Mar. 10, 2022

(51) Int. Cl.
*H01M 50/20* (2021.01)
*H01M 10/48* (2006.01)
*B64D 27/24* (2006.01)
*H01M 10/42* (2006.01)

(52) U.S. Cl.
CPC ............ *H01M 50/20* (2021.01); *B64D 27/24* (2013.01); *H01M 10/425* (2013.01); *H01M 10/486* (2013.01); *H01M 2220/20* (2013.01)

(58) Field of Classification Search
CPC ........ B64D 27/24; B64D 27/00; B64D 27/02; B64D 27/16; B64D 27/18; H01M 50/20; H01M 50/00; H01M 50/202; H01M 50/204; H01M 50/249; H01M 50/289; H01M 50/50; H01M 50/543; H01M 2220/20;

(Continued)

(56) References Cited

U.S. PATENT DOCUMENTS 6,211,646 B1 * 4/2001 Kouzu .............. H01M 10/6563
                                                       429/99
6,303,248 B1 * 10/2001 Peterson ............... H01M 50/59
                                                       429/177

(Continued)

FOREIGN PATENT DOCUMENTS

WO   WO2012168648     12/2012
WO   WO2019206409     10/2019

(Continued)

OTHER PUBLICATIONS

International Search Report; PCT/US21/47303; dated Nov. 23, 2021; By: Authorized Officer Kari Rodriquez.

*Primary Examiner* — James M Dolak
(74) *Attorney, Agent, or Firm* — Caldwell Intellectual Property Law

(57) ABSTRACT

A high energy density battery module may comprise a plurality of battery units. The battery units may be electronically coupled to at least one other battery unit and may further comprise a plurality of electrochemical battery cells. The battery units may comprise a cell retainer to fix cells in a predetermined arrangement comprising a first and second column of battery cells. The battery units may comprise protective wrapping of thermally insulating material woven between at least a portion of the first and second column of battery cells. An electrical contact may be may be disposed in or on each of the plurality of battery units.

20 Claims, 8 Drawing Sheets

(58) Field of Classification Search
CPC ............ H01M 10/425; H01M 10/486; H01M 10/658; H01M 10/48; H01M 10/65
See application file for complete search history.

(56) References Cited

U.S. PATENT DOCUMENTS

| | | | | |
|---|---|---|---|---|
| 6,410,184 | B1* | 6/2002 | Horiuchi | H01M 50/20 429/153 |
| 6,472,098 | B1* | 10/2002 | Sawada | H01M 50/20 429/96 |
| 6,933,076 | B2 | 8/2005 | Ura et al. | |
| 7,433,794 | B1* | 10/2008 | Berdichevsky | B60L 50/64 320/150 |
| 7,531,270 | B2* | 5/2009 | Buck | H01M 10/658 429/153 |
| 7,547,487 | B1* | 6/2009 | Smith | H01M 10/0413 429/57 |
| 7,550,228 | B2* | 6/2009 | Izawa | H01M 50/213 429/157 |
| 7,609,028 | B2* | 10/2009 | Ha | H01M 50/20 429/61 |
| 7,951,483 | B2* | 5/2011 | Onuki | H01M 50/264 429/149 |
| 8,263,250 | B2* | 9/2012 | Hermann | H01M 10/617 429/129 |
| 8,530,069 | B2* | 9/2013 | Wood | H01M 10/643 429/120 |
| 8,603,660 | B2* | 12/2013 | Houchin-Miller | H01M 10/6557 429/120 |
| 8,758,923 | B2* | 6/2014 | Yoon | H01M 10/0481 429/178 |
| 9,162,770 | B2* | 10/2015 | Stückl | B64D 27/24 |
| 9,219,262 | B2* | 12/2015 | Kimura | H01M 50/502 |
| 9,496,537 | B2* | 11/2016 | Bang | B23K 11/004 |
| 9,722,230 | B2* | 8/2017 | Fujiwara | H01M 50/572 |
| 9,761,852 | B2* | 9/2017 | Kim | H01M 50/35 |
| 9,847,182 | B2 | 12/2017 | Kusaba et al. | |
| 10,164,236 | B2* | 12/2018 | Yi | H01M 50/502 |
| 10,256,511 | B2* | 4/2019 | Clemente | H01M 50/522 |
| 10,263,229 | B2 | 4/2019 | Motokawa et al. | |
| 10,322,824 | B1* | 6/2019 | Demont | B60L 3/0061 |
| 10,511,002 | B2* | 12/2019 | Shimizu | H01M 50/308 |
| 10,569,891 | B2* | 2/2020 | Ferran | H01M 50/249 |
| 10,707,471 | B2* | 7/2020 | Newman | H01M 50/516 |
| 10,854,866 | B2* | 12/2020 | Demont | H01M 50/502 |
| 10,886,512 | B2* | 1/2021 | Bourke | B60L 53/14 |
| 10,950,833 | B2* | 3/2021 | Baumann | H01M 50/30 |
| 11,063,317 | B2* | 7/2021 | Nakano | H01M 10/0422 |
| 11,128,012 | B2* | 9/2021 | Kaga | H01M 50/502 |
| 11,148,819 | B2* | 10/2021 | Demont | H01M 50/35 |
| 11,217,862 | B2* | 1/2022 | Barton | H01M 50/20 |
| 11,233,287 | B2* | 1/2022 | Hacker | H01M 50/10 |
| 11,398,663 | B2* | 7/2022 | Park | H01M 50/502 |
| 11,424,502 | B2* | 8/2022 | Seol | H01M 10/613 |
| 11,431,051 | B2* | 8/2022 | Nakari | H01M 10/0525 |
| 11,437,682 | B2* | 9/2022 | Takano | H01M 10/6566 |
| 11,462,782 | B2* | 10/2022 | Lee | H01M 50/35 |
| 11,462,795 | B2* | 10/2022 | DeKeuster | H01M 50/262 |
| 11,462,798 | B2* | 10/2022 | Kwag | H01M 10/653 |
| 11,469,467 | B2* | 10/2022 | Muratsu | H01M 50/213 |
| 11,482,742 | B2* | 10/2022 | Ogino | H01M 50/20 |
| 11,495,845 | B2* | 11/2022 | Sasaki | H01M 50/293 |
| 11,502,360 | B2* | 11/2022 | Haeusler | H01M 10/6556 |
| 11,502,377 | B2* | 11/2022 | Cano | H01M 50/213 |
| 11,509,001 | B2* | 11/2022 | Jiang | H01M 50/227 |
| 11,515,598 | B2* | 11/2022 | Bae | H01M 50/20 |
| 2005/0079408 | A1* | 4/2005 | Hirano | B60L 50/64 429/174 |
| 2006/0170396 | A1 | 8/2006 | Ha et al. | |
| 2007/0087266 | A1* | 4/2007 | Bourke | H01M 50/207 429/61 |
| 2010/0151309 | A1 | 6/2010 | Marukara et al. | |
| 2012/0135293 | A1* | 5/2012 | Gu | B60K 1/04 429/156 |
| 2012/0308848 | A1 | 12/2012 | Miyamae et al. | |
| 2013/0183566 | A1 | 7/2013 | Wayne et al. | |
| 2016/0006007 | A1 | 1/2016 | Takasaki et al. | |
| 2016/0064783 | A1* | 3/2016 | Chorian | H01M 10/625 429/120 |
| 2016/0254576 | A1* | 9/2016 | Burns | H01M 50/572 429/61 |
| 2017/0194616 | A1 | 7/2017 | Yang | |
| 2017/0301964 | A1* | 10/2017 | Murakami | H01M 50/20 |
| 2018/0019447 | A1 | 1/2018 | Adonakis | |
| 2018/0090731 | A1 | 3/2018 | Knowles et al. | |
| 2018/0277808 | A1 | 9/2018 | Kruszelnicki | |
| 2019/0109356 | A1 | 4/2019 | Kaga | |
| 2019/0207188 | A1 | 7/2019 | Miller et al. | |
| 2019/0259986 | A1 | 8/2019 | Harris, III | |
| 2019/0312251 | A1 | 10/2019 | Matthews | |
| 2019/0372068 | A1 | 12/2019 | Naito et al. | |
| 2019/0372173 | A1 | 12/2019 | Juzkow et al. | |
| 2019/0386356 | A1 | 12/2019 | Jiang et al. | |
| 2020/0168881 | A1 | 5/2020 | Woeste et al. | |

FOREIGN PATENT DOCUMENTS

WO     2019241768 A1     12/2019
WO     2020133657 A1     7/2020

\* cited by examiner

SYSTEM AND METHOD FOR HIGH ENERGY DENSITY BATTERY MODULE

CROSS-REFERENCE TO RELATED APPLICATIONS

This application shares subject matter with U.S. patent application Ser. No. filed concurrently with the present application on Sep. 4, 2020, and here incorporates by reference in its entirety.

FIELD OF INVENTION

The present invention generally relates to the field of aircraft and aircraft components. In particular, the present invention is directed to a high energy density battery module for an electric aircraft.

BACKGROUND

The burgeoning of electric vertical take-off and landing (eVTOL) aircraft technologies promises an unprecedented forward leap in energy efficiency, cost savings, and the potential of future autonomous and unmanned aircraft. However, the technology of eVTOL aircraft is still lacking in crucial areas of high energy density power solutions. This is particularly problematic as it compounds the already daunting challenges to designers and manufacturers developing the aircraft for manned and/or unmanned flight in the real world. Energy density is a critical characteristic of power sources because it directly limits maximum take-off weight. A power source needs to pack the maximum amount of energy in the lightest possible configuration. The future of electric aircraft and specifically, eVTOL aircraft, is linked to an increase in energy density in electric power sources.

SUMMARY OF DISCLOSURE

In an aspect, a high energy density battery module may comprise a plurality of battery units. The battery units may be electronically coupled to at least on other battery unit and may further comprise a plurality of electrochemical battery cells. The battery units may comprise a cell retainer to fix cells in a predetermined arrangement comprising a first and second column of battery cells and a cell guide which may be machined out of a metal, like aluminum. The battery units may comprise protective wrapping of thermally insulating material woven between at least a portion of the first and second column of battery cells. An electrical contact may be disposed in or on each of the plurality of battery units. A battery cell may comprise a radius and the first and second column may be arranged offset from one another by a distance equal to the radius. The battery unit may comprise opposite and opposing sides with a first side may be in contact with at least a portion of a first surface of another battery unit. Battery module may comprise a sense board configured to detect temperature of a battery cell, which may indicate battery cell failure. The sense board may comprise a plurality of holes equal to and disposed the same as the number of battery cells within battery units. The battery module is configured to provide electrical power to at least a portion of an eVTOL aircraft. The battery module may comprise a back plate which may further comprise thermally insulating material. The battery module may further comprise an end cap which includes a non-electrically conductive component and a protrusion disposed on it which is configured to mechanically couple end cap to side panel. The battery module may include a side panel which forms at least a side of battery module.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
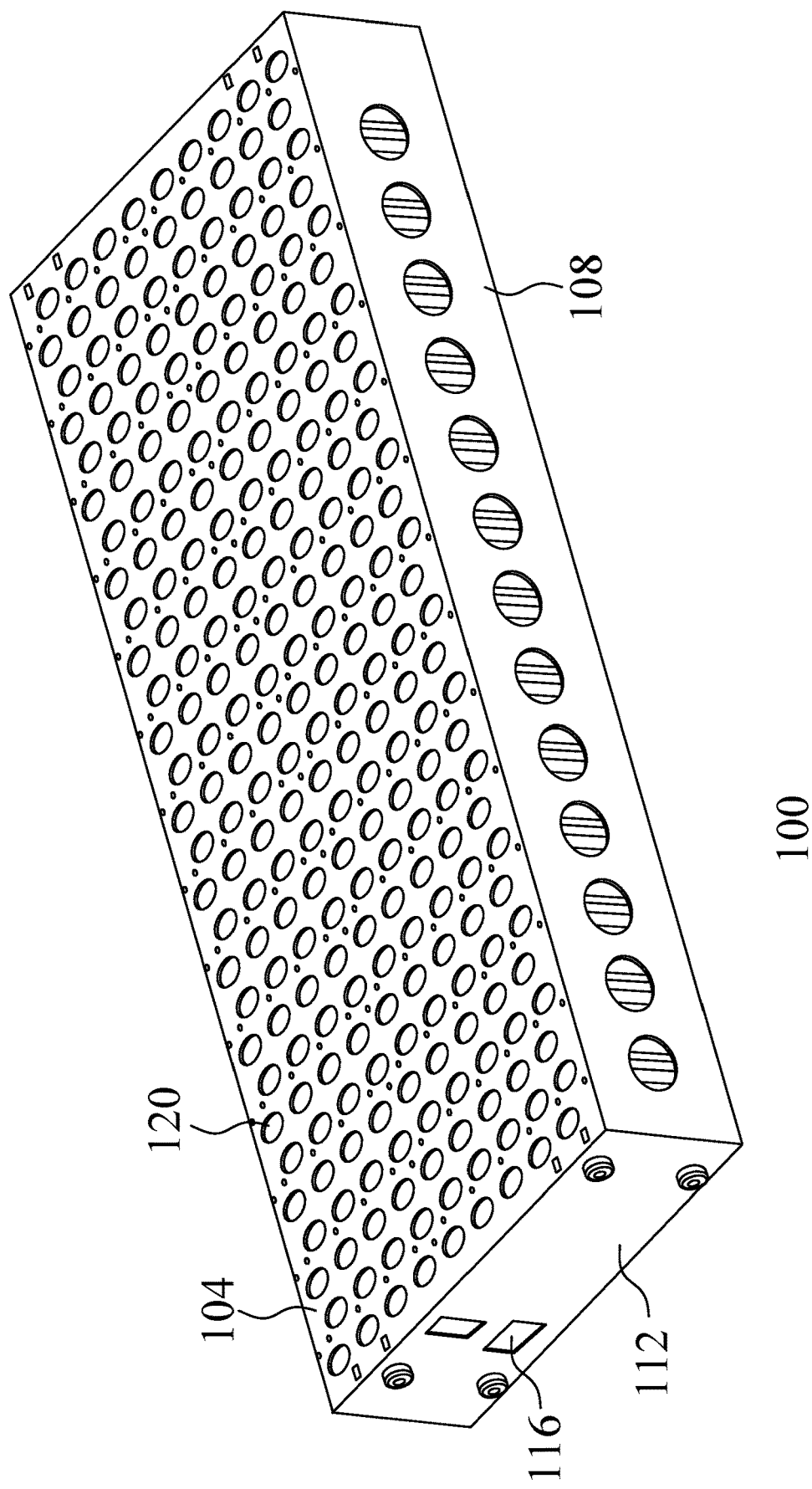
FIG. 1 is an isometric view illustrating an embodiment of a high energy density battery module.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Aspects of the present disclosure describe a power source for an eVTOL aircraft, specifically, a high-energy density battery module. In an embodiment, the assembly may provide electric power to at least a portion of an eVTOL aircraft for manned and/or unmanned flight. In an embodiment, the battery module may comprise a plurality of battery cells wired together in series and/or in parallel. In embodiments, the battery module may be disposed between a back plate, a sense board, end caps, and side panels that are disposed such that they enclose the six sides of the battery module. In an embodiment, a back plate and a sense board are disposed around battery module opposite and opposing each other and in a similar orientation, and themselves may comprise opposite and opposing surfaces, a first end cap may be disposed opposite and opposing each other, and a first side panel may be disposed opposite and opposing a second side panel. In an embodiment, a battery module may be disposed in or on an eVTOL aircraft and may provide power to at least a portion of an aircraft in flight or on the ground, for example, the battery module may provide power within an entire flight envelope of an aircraft including, for example, emergency procedures. The battery module may comprise thermal management systems and onboard computers to manage battery power output and general operation. The battery module, as a whole, may comprise hardware for mechanical and electrical coupling to at least a portion of eVTOL aircraft.

Energy density, as used herein, is defined as the amount of energy stored in a given system or region of space per unit volume and colloquially, energy per unit mass (also known as "specific energy"), the units of which may be presented in Joules per kilogram (J/kg), kilocalories per gram (kcal/g), British Thermal Units per pound mass (BTU/lb), and in SI base units, meters squared per seconds squared ($m^2/s^2$), and for the purposes of this disclosure Watt hours per kilogram (Wh/kg).

In this way, a battery module having a high-energy power density is accomplished. For example, configured as discussed above, the battery module may comprise an energy density equal to or greater than 150 Wh/kg.

Referring now to FIG. 1, an exemplary embodiment of battery module 100 is illustrated with sense board and one side panel removed to illustrate internal components more clearly. In embodiments, each circle illustrated represents a battery cell's circular cross-section. A battery cell, which will be adequately described below may take a plurality of forms, but for the purposes of these illustrations and disclosure, will be represented by a cylinder, with circles in representing the cross section of one cell each. With this orientation, a cylindrical battery cell has a long axis not visible in illustration. Battery cells are disposed in a staggered arrangement, with one battery unit comprising two columns of staggered cells. Each battery unit includes at least a cell retainer comprising a sheet of material with holes in a staggered pattern corresponding to the staggered orientation of cells. The cell retainer is the component which fixes battery cells in their orientation amongst the entirety of the battery module. A cell retainer also comprises two columns of staggered holes corresponding to the battery cells. There is a cell guide disposed between each set of two columns of battery cells underneath the cell retainer. The battery module can include a protective wrapping which weaves in between the two columns of battery cells contained in a battery unit.

With continued reference to FIG. 1, battery module 100 including sense board 104, side panel 108, end cap 112, electrical bus 116, and openings 120 are presented. In an embodiment, sense board 104 is illustrated in its entirety. Sense board 104 may comprise at least a portion of a circuit board that includes one or more sensors configured to measure the temperature of battery cells disposed within battery module 100. In embodiment, sensor board 104 may include one or more openings 120 disposed in rows and column on a surface of sense board 104. In embodiments, each hole may correspond to battery cells disposed within, encapsulated, at least in part, by battery units. For example, the location of each hole may correspond to the location of each battery cell disposed within battery module 100.

According to embodiment, battery module 100 can include one or more side panels 108. Side panel 108 can include a protective layer of material configured to create a barrier between internal components of battery module 100 and other aircraft components or environment. Side panel 108 may comprise opposite and opposing faces that form a side of and encapsulate at least a portion of battery module 100. Side panel 108 may comprise metallic materials like aluminum, aluminum alloys, steel alloys, copper, tin, titanium, another undisclosed material, or a combination thereof. Side panel 108 may not preclude use of nonmetallic materials alone or in combination with metallic components permanently or temporarily coupled together.

Nonmetallic materials that may be used alone or in combination in the construction of side panel 108 may comprise high density polyethylene (HDPE), polypropylene, polycarbonate, acrylonitrile butadiene styrene, polyethylene, nylon, polystyrene, polyether ether ketone, to name a few. Side panel 108 may be manufactured by a number of processes alone or in combination, including but limited to, machining, milling, forging, casting, 3D printing (or other additive manufacturing methods), turning, or injection molding, to name a few. One of ordinary skill in the art would appreciate that side panel 108 may be manufactured in pieces and assembled together by screws, nails, rivets, dowels, pins, epoxy, glue, welding, crimping, or another undisclosed method alone or in combination. Side panel 108 may be coupled to sense board 104, back plate, and/or end cap 112 through standard hardware like a bolt and nut mechanism, for example.

With continued reference to FIG. 1, battery module 100 may also comprise one or more end caps 112. End cap 112 may comprise a nonconductive component configured to align the back plate, sense board 104, and internal battery components of battery module 100 and hold their position. End cap 112 may form and end of and encapsulate a portion of a first end of battery module 100 and a second opposite and opposing end cap may form a second end and encapsulate a portion of a second end of battery module 100. End cap 112 may comprise a snap attachment mechanism further comprising a protruding boss which can configured to be captured, at least in part by a receptable of a corresponding size, by a receptacle disposed in or on the back plate. End cap 112 may employ a similar or same method for coupling itself to sense board 104, which may comprise a similar or the same receptacle. One or ordinary skill in the art would appreciate that the embodiments of a quick attach/detach mechanism end cap is only an example and any number of mechanisms and methods may be used for this purpose. It should also be noted that other mechanical coupling mechanisms may be used that are not necessarily designed for quick removal. Said mechanical coupling may include, as a non-limiting example, rigid coupling (e.g. beam coupling), bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. End cap 112 may comprise a nonconductive component manufactured from or by a process that renders it incapable or unsuitable for conveying electrical through, on, or over it. Nonconductive materials end cap 112 may comprise may be paper, Teflon, glass, rubber, fiberglass, porcelain, ceramic, quartz, various plastics like HDPE, ABS, among others alone or in combination.

End cap 112 may comprise electrical bus 116. Electrical bus 116, for the purposes of this disclosure and in electrical parlance is any common connection to which any number of loads, which may be connected in parallel, and share a relatively similar voltage may be electrically coupled. Electrical bus 116 may refer to power busses, audio busses, video busses, computing address busses, and/or data busses. Electrical bus 116 may be responsible for conveying electrical energy stored in battery module 100 to at least a portion of an eVTOL aircraft. The same or a distinct electrical bus 116 may additionally or alternatively responsible for conveying electrical signals generated by any number of components within battery module 100 to any destination on or offboard an eVTOL aircraft. End cap 112 may comprise wiring or conductive surfaces only in portions required to electrically couple electrical bus 116 to electrical power or necessary circuits to convey that power or signals to their destinations.

Figure 2:
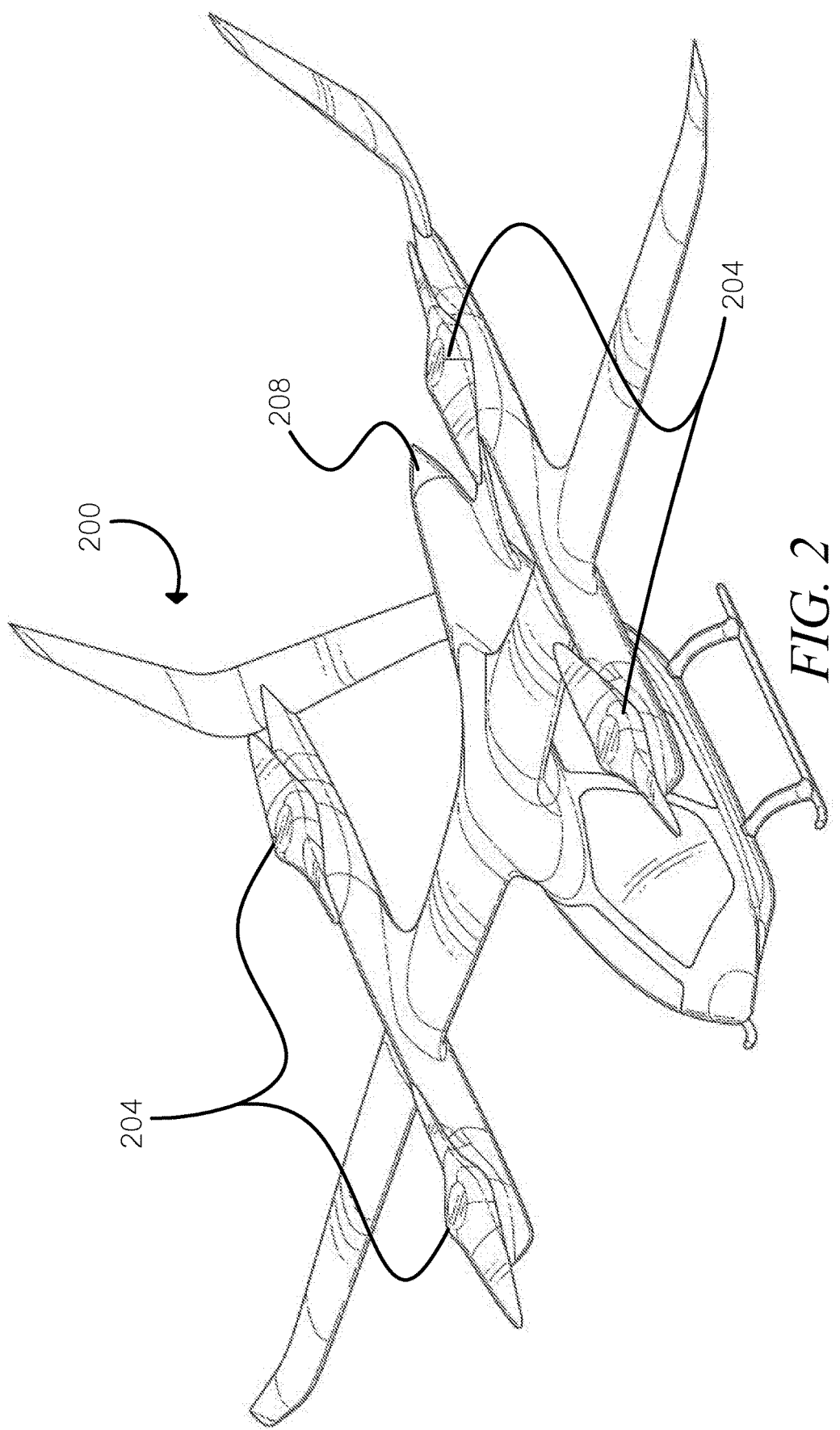
FIG. 2 is an isometric view illustrating an eVTOL aircraft, according to an example embodiment.

Referring now to FIG. 2, an isometric view of dual-mode aircraft 200 that may have receiver assembly 100 disposed in and/or on it and further configured to receive battery assembly 300 is presented. Dual-mode aircraft 200 can comprise an autonomous aircraft, a vertical take-off and landing aircraft, an electric take-off and landing aircraft, a quadcopter, a tilt-rotor aircraft, a fixed wing aircraft, a captured lift fan aircraft, a hovercraft, a combination thereof, or another aircraft not listed herein.

In embodiments, dual-mode aircraft may include vertical propulsor 204 and forward propulsor 208. Forward propulsor 208 can comprise a propulsor configured to propel dual-mode aircraft 200 in a forward direction. Forward in this context is not an indication of the propulsor position on aircraft 200. In embodiments, one or more forward propulsors 208 can be mounted on the front, on the wings, at the rear, etc. of dual-mode aircraft 200. Vertical propulsor 204 can comprise a propulsor configured to propel the aircraft in an upward direction. One of ordinary skill in the art would understand upward to comprise the imaginary axis protruding from the earth at a normal angle, configured to be normal to any tangent plane to a point on a sphere (i.e. skyward). In embodiments, vertical propulsor 204 may be mounted on the front, on the wings, at the rear, and/or any suitable location of aircraft 200. A "propulsor", as used herein, is a component or device used to propel a craft by exerting force on a fluid medium, which may include a gaseous medium such as air or a liquid medium such as water. In an embodiment, vertical propulsor 204 can be a propulsor that generates a substantially downward thrust, tending to propel an aircraft in an opposite, vertical direction and provides thrust for maneuvers. Such maneuvers can include, without limitation, vertical take-off, vertical landing, hovering, and/or rotor-based flight such as "quadcopter" or similar styles of flight. According to embodiments, forward propulsor 208 can comprise a propulsor positioned for propelling an aircraft in a "forward" direction. Here, forward propulsor 208 may include one or more propulsors mounted on the front, on the wings, at the rear, or a combination of any such positions. Forward propulsor can be configured to propel aircraft 200 forward for fixed-wing and/or "airplane"-style flight, takeoff and/or landing, and/or may propel the aircraft forward or backward on the ground.

In embodiments, vertical propulsor 204 and forward propulsor 208 may also each include a thrust element. A thrust element may include any device or component that converts mechanical energy of a motor, for instance in the form of rotational motion of a shaft, into thrust within a fluid medium. A thrust element may include, without limitation, a device using moving or rotating foils, including without limitation one or more rotors, an airscrew or propeller, a set of airscrews or propellers such as contra-rotating propellers, a moving or flapping wing, or the like. A thrust element may include without limitation a marine propeller or screw, an impeller, a turbine, a pump-jet, a paddle or paddle-based device, or the like. As another non-limiting example, a thrust element may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as a thrust element.

According to embodiments, vertical propulsor 204 and forward propulsor 208 may also include a motor mechanically coupled to a respective propulsor as a source of thrust. Said motor may include, without limitation, any electric motor that comprises a device to convert electrical energy into mechanical energy, such as, for instance, by causing a shaft to rotate. A motor may be driven by direct current (DC) electric power—for instance, a motor may include a brushed DC a motor, or the like. In embodiments, a motor may be driven by electric power having varying or reversing voltage levels, such as alternating current (AC) power as produced by an AC generator, inverter, and/or otherwise varying power, such as produced by a switching power source. In embodiments, a motor may include, without limitation, brushless DC electric motors, permanent magnet synchronous motor, switched reluctance motors, induction motors, or any combination thereof. According to embodiments, a motor may include a driving circuit such as electronic speed controllers and/or any other components for regulating motor speed, rotation direction, and/or dynamic braking (i.e. reverse thrust).

Figure 3:
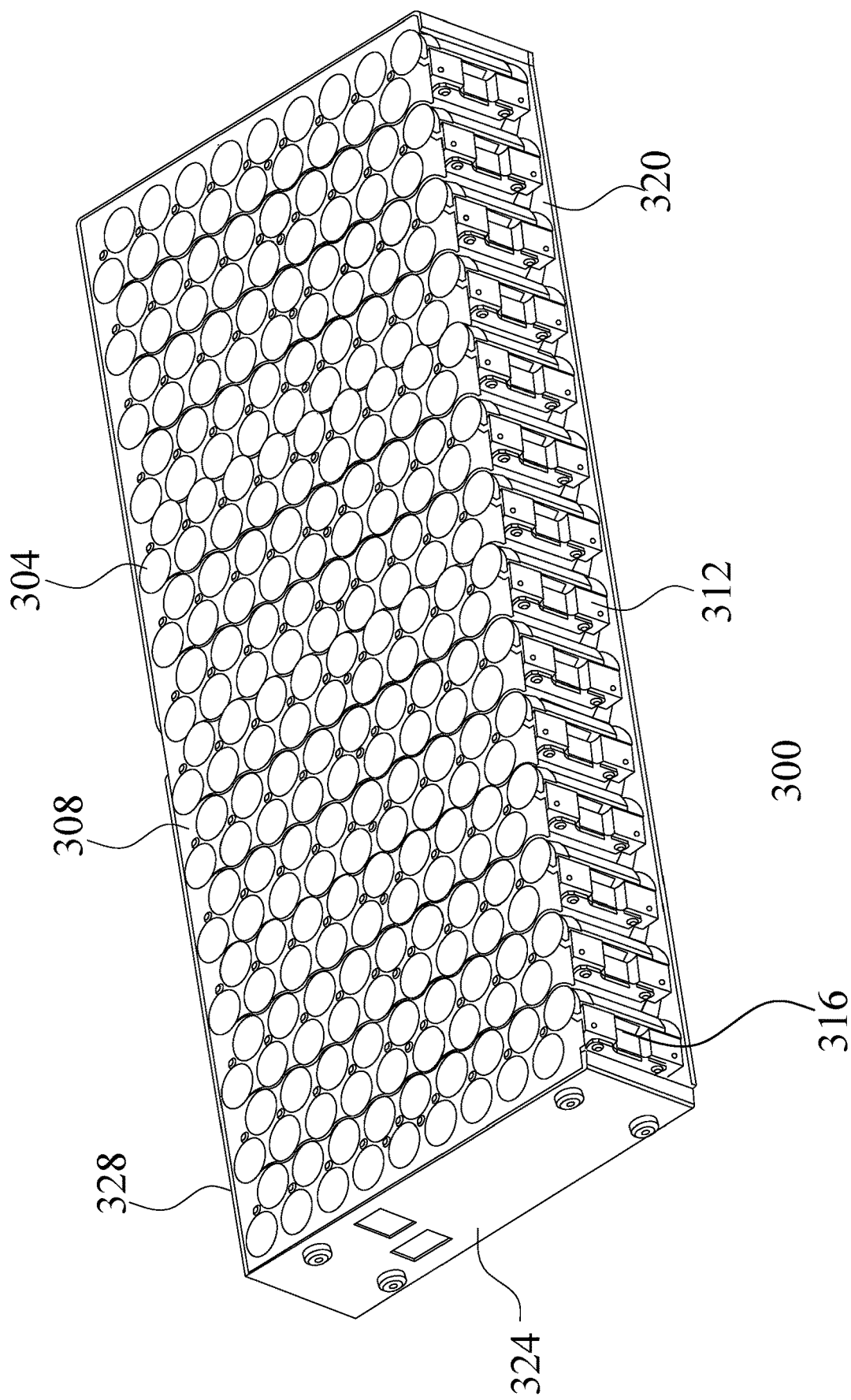
FIG. 3 is an isometric view illustrating a battery module with multiple battery units, according to embodiments.

Referring now to FIG. 3, battery module 300 with multiple battery units 316 is illustrated, according to embodiments. Battery module 300 may comprise a battery cell 304, cell retainer 308, cell guide 312, protective wrapping, back plate 320, end cap 324, and side panel 328. Battery module 300 may comprise a plurality of battery cells, an individual of which is labeled 304. In embodiments, battery cells 304 may be disposed and/or arranged within a respective battery unit 316 in groupings of any number of columns and rows. For example, in the illustrative embodiment of FIG. 3, battery cells 304 are arranged in each respective battery unit 316 with 18 cells in two columns. It should be noted that although the illustration may be interpreted as containing rows and columns, that the groupings of battery cells in a battery unit, that the rows are only present as a consequence of the repetitive nature of the pattern of staggered battery cells and battery cell holes in cell retainer being aligned in a series. While in the illustrative embodiment of FIG. 3 battery cells 304 are arranged 18 to battery unit 316 with a plurality of battery units 316 comprising battery module 300, one of skill in the art will understand that battery cells 304 may be arranged in any number to a row and in any number of columns and further, any number of battery units may be present in battery module 300. According to embodiments, battery cells 304 within a first column 332 may be disposed and/or arranged such that they are staggered relative to battery cells 304 within a second column 336. In this way, any two adjacent rows of battery cells 304 may not be laterally adjacent but instead may be respectively offset a predetermined distance. In embodiments, any two adjacent rows of battery cells 304 may be offset by a distance equal to a radius of a battery cell. This arrangement of battery cells 304 is only a non-limiting example and in no way preclude other arrangement of battery cells.

In embodiments, battery cells 304 may be fixed in position by cell retainer 308. For the illustrative purposed within FIG. 3, cell retainer 308 is depicted as the negative space between the circles representing battery cells 304. Cell retainer 308 comprises a sheet further comprising circular openings that correspond to the cross-sectional area of an individual battery cell 304. Cell retainer 308 comprises an arrangement of openings that inform the arrangement of battery cells 304. In embodiments, cell retainer 308 may be configured to non-permanently, mechanically couple to a first end of battery cell 304.

According to embodiments, battery module 300 may further comprise a plurality of cell guides 312 corresponding to each battery unit 316. Cell guide 312 may comprise a solid extrusion with cutouts (e.g. scalloped) corresponding to the radius of the cylindrical battery cell 304. A planform view of cell guide 312 is presented below with reference to FIG. 4A. Cell guide 312 may be positioned between the two columns of a battery unit 316 such that it forms a surface (e.g. side surface) of the battery unit 316. In embodiments, the number of cell guides 312 therefore match in quantity to the number of battery units 316. Cell guide 312 may comprise a material suitable for conducting heat and will be discussed in further detail below with reference to FIG. 4A.

Battery module 300 may also comprise a protective wrapping woven between the plurality of battery cells 304. Protective wrapping may provide fire protection, thermal containment, and thermal runaway during a battery cell malfunction or within normal operating limits of one or more battery cells 304 and/or potentially, battery module 300 as a whole. Battery module 300 may also comprise a backplate 320. Backplate 320 is configured to provide structure and encapsulate at least a portion of battery cells 304, cell retainers 308, cell guides 312, and protective wraps. End cap 324 may be configured to encapsulate at least a portion of battery cells 304, cell retainers 308, cell guides 312, and battery units 316, as will be discussed further below, end cap may comprise a protruding boss that clicks into receivers in both ends of back plate 320, as well as a similar boss on a second end that clicks into sense board. Side panel 328 may provide another structural element with two opposite and opposing faces and further configured to encapsulate at least a portion of battery cells 304, cell retainers 308, cell guides 312, and battery units 316.

In embodiments, battery module 300 can include one or more battery cells 304. In another embodiment, battery module 300 comprises a plurality of individual battery cells 304. Battery cells 304 may each comprise a cell configured to include an electrochemical reaction that produces electrical energy sufficient to power at least a portion of an eVTOL aircraft. Battery cell 304 may include electrochemical cells, galvanic cells, electrolytic cells, fuel cells, flow cells, voltaic cells, or any combination thereof—to name a few. In embodiments, battery cells 304 may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells 304 may use the term 'wired', but one of ordinary skill in the art would appreciate that this term is synonymous with 'electrically connected', and that there are many ways to couple electrical elements like battery cells 304 together. As an example, battery cells 304 can be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 304 may be wired in a series-parallel circuit which combines characteristics of the constituent circuit types to this combination circuit. Battery cells 304 may be electrically connected in any arrangement which may confer onto the system the electrical advantages associated with that arrangement such as high-voltage applications, high-current applications, or the like.

As used herein, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other.

According to embodiments and as discussed above, any two rows of battery cells 304 and therefore cell retainer 308 openings are shifted one half-length so that no two battery cells 304 are directly next to the next along the length of the battery module 300, this is the staggered arrangement presented in the illustrated embodiment of FIG. 3. Cell retainer 308 may employ this staggered arrangement to allow more cells to be disposed closer together than in square columns and rows like in a grid pattern. The staggered arrangement may also be configured to allow better thermodynamic dissipation, the methods of which may be further disclosed hereinbelow. Cell retainer 308 may comprise staggered openings that align with battery cells 304 and further configured to hold battery cells 304 in fixed positions. Cell retainer 308 may comprise an injection molded component. Injection molded component may comprise a component manufactured by injecting a liquid into a mold and letting it solidify, taking the shape of the mold in its hardened form. Cell retainer 308 may comprise liquid crystal polymer, polypropylene, polycarbonate, acrylonitrile butadiene styrene, polyethylene, nylon, polystyrene, polyether ether ketone, to name a few. Cell retainer 308 may comprise a second cell retainer fixed to the second end of battery cells 304 and configured to hold battery cells 304 in place from both ends. The second cell retainer may comprise similar or the exact same characteristics and functions of first cell retainer 308. Battery module 300 may also comprise cell guide 312. Cell guide 312, which will be explained in detail below with reference to FIG. 4A, comprises material disposed in between two rows of battery cells 304. In embodiments, cell guide 312 can be configured to distribute heat that may be generated by battery cells 304.

According to embodiments, battery module 300 may also comprise back plate 320. Back plate 320 is configured to provide a base structure for battery module 300 and may encapsulate at least a portion thereof. Backplate 320 can have any shape and includes opposite, opposing sides with a thickness between them. In embodiments, back plate 320 may comprise an effectively flat, rectangular prism shaped sheet. For example, back plate 320 can comprise one side of a larger rectangular prism which characterizes the shape of battery module 300 as a whole. Back plate 320 also comprises openings correlating to each battery cell 304 of the plurality of battery cells 304. Back plate 320 may comprise a lamination of multiple layers. The layers that are laminated together may comprise FR-4, a glass-reinforced epoxy laminate material, and a thermal barrier of a similar or exact same type as disclosed hereinabove. Back plate 320 may be configured to provide structural support and containment of at least a portion of battery module 300 as well as provide fire and thermal protection.

According to embodiments, battery module 300 may also comprise first end cap 324 configured to encapsulate at least a portion of battery module 300. End cap 324 may provide structural support for battery module 300 and hold back plate 320 in a fixed relative position compared to the overall battery module 300. End cap 324 may comprise a protruding boss on a first end that mates up with and snaps into a receiving feature on a first end of back plate 320. End cap 324 may comprise a second protruding boss on a second end that mates up with and snaps into a receiving feature on sense board.

Battery module 300 may also comprise at least a side panel 328 that may encapsulate two sides of battery module 300. Side panel 328 may comprise opposite and opposing faces comprising a metal or composite material. In the illustrative embodiment of FIG. 3, a second side panel 328 is present but not illustrated so that the inside of battery module 300 may be presented. Side panel(s) 328 may provide structural support for battery module 300 and provide a barrier to separate battery module 300 from exterior components within aircraft or environment.

Figure 4A:
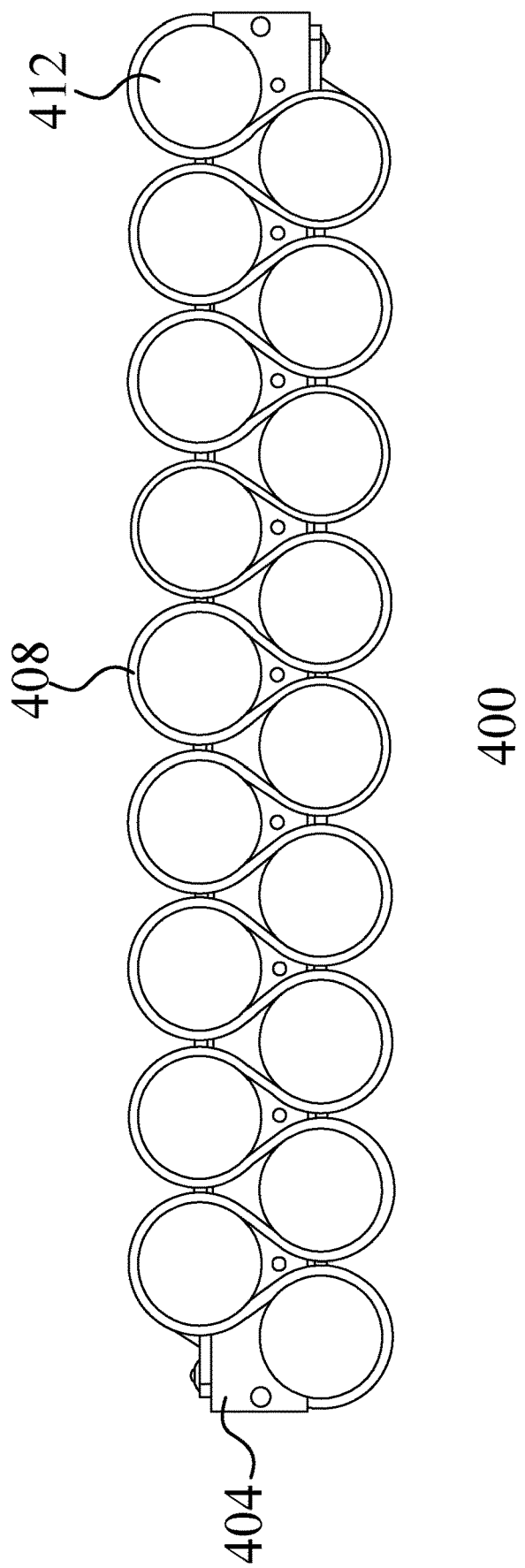
FIG. 4A is a planform view illustrating a cell guide and protective wrapping between two rows of cell guides, according to embodiments.

Referring now to FIG. 4A, a planform view of two columns of battery cell openings is illustrated, according to embodiments. For example, the two columns may include the first column 332 and the second column 336. For illustration purposes, battery unit 400 does not include battery cells. Battery unit 400 comprises cell guide 404, which is similar or the same as cell guide 312. Cell guide 404 may comprise a long, scalloped cross-section to receive a portion of cylindrical battery cells. Cell guide 404 may be configured to distribute heat from the plurality of battery cells it partially captures and direct that energy away from cells like a thermodynamic fin. Cell guide 404 may comprise a plurality of possible materials which possess thermodynamically conductive characteristics like aluminum, copper, silver, steel alloys, a combination thereof, or another undisclosed material alone or in combination. Materials for cell guide 404 may not exclusively be metals but also another type of material suitable for conducting heat energy out of and away from battery cells. In non-limiting examples, cell guide 404 may be machined, milled, 3D printed, molded, forged, cast, or turned, to name a few manufacturing processes based on suitable material selection.

With continued reference to FIG. 4A, a planform view of protective wrapping 408 is illustrated from a planform view. In embodiments, battery module 300 may comprise protective wrapping and be configured to include multiple loops. Protective wrapping may be woven between battery cells and be configured to thermally insulate battery cells from each other. Protective wrapping can be configured to provide thermal containment for each battery cell within battery module. Protective wrapping may be woven along the circumference of the long axis of approximately cylindrical battery cells and serpentine in and out of the two columns of battery cells. In embodiments, protective wrapping may be woven in a plurality of ways including plain weaving, oxford weaving, braiding, and plaiting, among others. In this way each battery cell may be captured in its own loop, thermally isolating each battery cell from the next. Protective wrapping may be configured to prevent thermal runaway due to heat energy generated by battery cells. Protective wrapping may comprise fire protection material configured to contain a fire in an area in which it surrounds. Fire protection material, in general may comprise fire-retardant and or fire-resistant materials. Fire-retardant material is designed to burn slowly and therefore slow down the movement of fire through the medium of the material, thereby protecting components on the other side of it in time for countermeasures to be deployed, amongst other mitigation methods. Fire-resistant materials are configured to resist burning and withstand heat and in the application of protective wrapping may contain fire and heat energy in the location it is present, thereby preventing it from damaging other locations in battery module 300 or surrounding areas. Fire-retardant materials used in textiles similar or the same to protective wrapping may comprise aramids, FR cotton, coated nylon, carbon foam (CFOAM), polyhydroquinone, dimidazopyridine, melamine, modacrylic, leather, Polybenzimidazole (PBI) to name a few.

The serpentine weaving of protective wrapping 408 between all battery cell spaces 412 (note that this is only a negative space for the illustration and that this is where a cell would be located once fully assembled) show that each battery cell space 412 is physically separated from each other. This physical separation serves to thermally insulate each cell space 412. It should be noted as well that with serpentine wrapping, a full wrap of each cell may be accomplished using a single sheet (or unit in which it is produced or cut) of protective wrapping 408. The advantage of this single protective wrapping 408 is ease of installation and maintenance and in no way limits the assembly from individually wrapping cells with material or precludes the use of more than one protective wrapping in a similar or unique arrangement. Battery unit 400, when fully assembled, embodies the building blocks of battery module 100. Battery unit 400 may be electrically and mechanically coupled together and encapsulated within side panels, back plate, sense board, and end caps, to produce battery module 100, described hereinbelow.

Figure 4B:
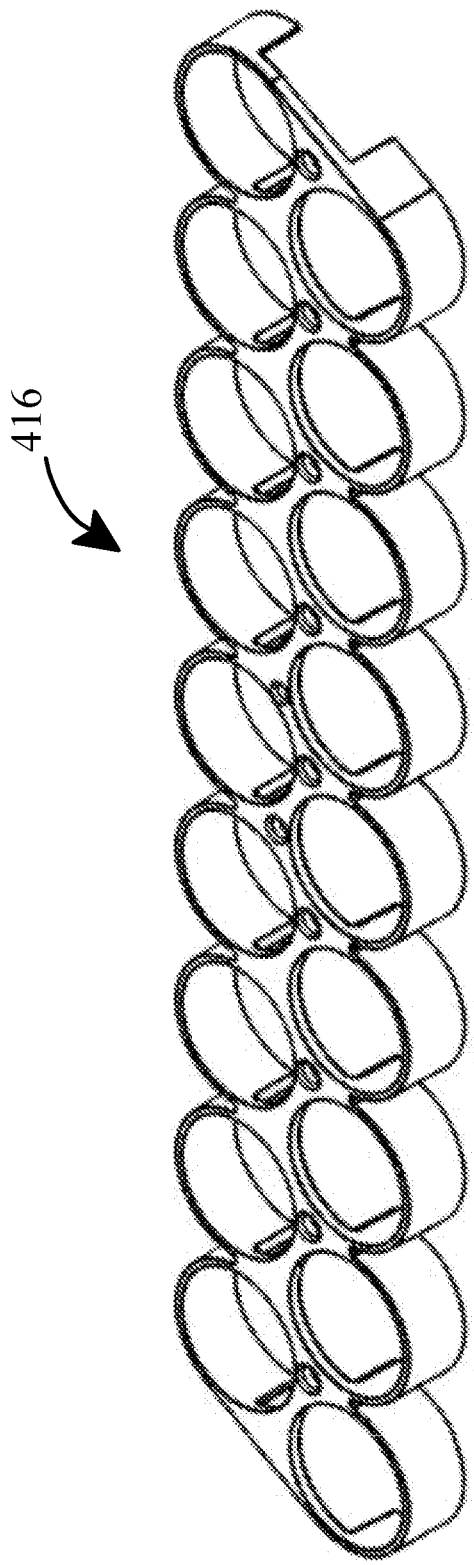
FIG. 4B is an isometric view illustrating an embodiment of a cell retainer present in battery module, according to embodiments.

Referring now to FIG. 4B, an embodiment of cell retainer 416 is illustrated. Battery module 100 may be configured to include cell retainer 416 in each battery unit 416. Cell retainer 416 is a component of a respective battery unit 428 aligned on the first side of battery module 400. Cell retainer 416 may comprise an injection molded component. Injection molding may include any means of injection molding, as described in the entirety of this disclosure. Cell retainer 416 is configured to align a plurality of battery cells 420 in a fixed position in battery module 400. Cell retainer 416 is configured to comprise an opening corresponding to each battery cell of the plurality of battery cells 420, wherein the opening may be mechanically coupled to an end of each battery cell of the plurality of battery cells 420. The configuration of the openings of cell retainer 416 may include any configuration of the plurality of battery cells as described in the entirety of this disclosure. For example, and without limitation, in the embodiment of FIG. 4B, cell retainer 416 is configured to include openings wherein two columns of battery cells with nine batteries per column can be aligned in one battery unit. Cell retainer 416 may include an opening corresponding to the at least a cell guide of the battery unit. Cell retainer 416 may be further configured to align on the second side of the battery module 400, wherein cell retainer 416 may be configured on both ends of each battery cell of the plurality of battery cells 420 of a respective battery unit. Persons skilled in the art, upon reviewing the entirety of this disclosure, will be aware of components that may be used as a cell retainer consistently with this disclosure.

Figure 5:
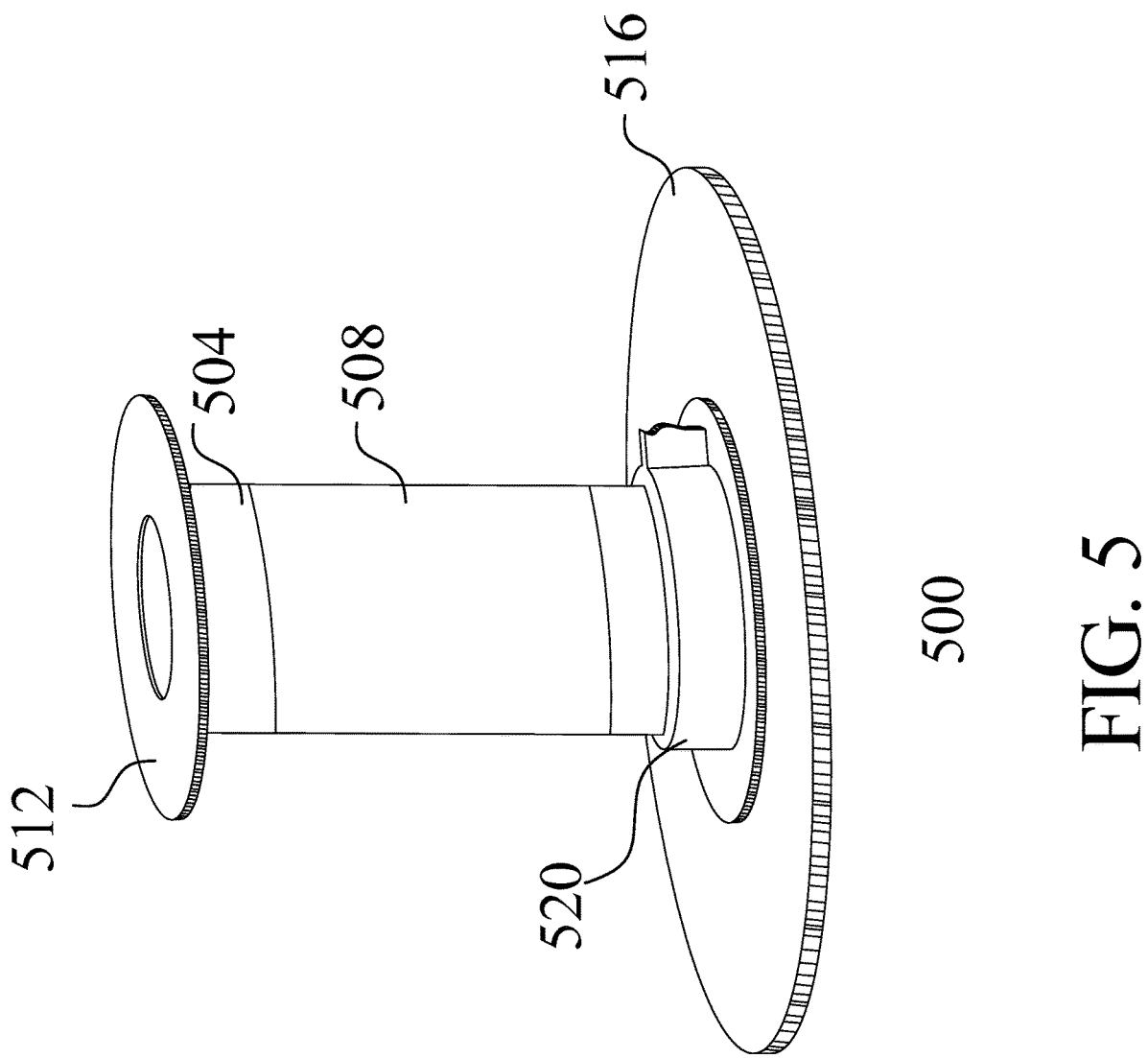
FIG. 5 is an isometric view illustrating an individual battery cell and cutaways of surrounding components, according to embodiments.

Referring now to FIG. 5, an individual seated battery cell 500 within battery module 100 and specifically within any of the plurality of battery units 316 is shown, according to embodiments. For reference, dashed edges extend past what is shown. Seated battery cell 500 is shown with one cell retainer about a first end of battery cell hidden for clarity. Battery cell 504, which may be similar or the same as battery cell(s) 304 and is seated within battery module 100 with aforementioned components hidden for clarity that will be disclosed further hereinbelow. Protective wrapping 508, which may be similar or the same protective wrapping 408 is shown by overlay lines where it wraps around battery cell 504. Battery cell 504 comprises a cylindrical shape and protective wrapping 508 is configured to surround battery cell 504 and thermally insulate battery cell 504 from surrounding cells. A cutaway from sense board 512 is shown with opening aligned with battery cell 504. Sense board 512 may comprise a battery management system, which may monitor battery cells 504 in a plurality of ways including temperature and voltage. Sense board 512 may comprise a rectangular prism shape configured to be opposite and oppose back plate 516 with openings correlating to battery cells 504. Sense board 512 may include one or more circuits and/or circuit elements, including without limitation a printed circuit board component, aligned with a first side of battery module 100 and the openings correlating to battery cells 504. Sense board 512 may include, without limitation, a control circuit configured to perform and/or direct any actions performed by sense board 512 and/or any other component and/or element described in this disclosure; control circuit may include any analog or digital control circuit, including without limitation a combinational and/or synchronous logic circuit, a processor, microprocessor, microcontroller, or the like.

Still referring to FIG. 5, sense board 512 may include sensors configured to measure physical and/or electrical parameters, such as without limitation temperature and/or voltage, of one or more battery cells. Sense board 512 and/or a control circuit incorporated therein and/or communicatively connected thereto, may further be configured to detect failure within each battery cell 504, for instance and without limitation as a function of and/or using detected physical and/or electrical parameters. Cell failure may be characterized by a spike in temperature and sense board 512 may be configured to detect that increase and generate signals, which are discussed further below, to notify users, support personnel, safety personnel, maintainers, operators, emergency personnel, aircraft computers, or a combination thereof. Sense board 512 may comprise thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Heat energy is, at its core, the measure of kinetic energy of matter present within a system. Temperature, as measured by any number or combinations of sensors present on sense board 512, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

Alternatively or additionally, and with continued reference to FIG. 5, sense board 512 may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like.

With continued reference to FIG. 5, sense board 512 and/or a control circuit incorporated therein and/or communicatively connected thereto may be configured to adjust charge to one or more battery cells as a function of a charge level and/or a detected parameter. For instance, and without limitation, sense board 512 may be configured to determine that a charge level of a battery cell is high based on a detected voltage level of that battery cell. Sense board 512 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like.

Further referring to FIG. 5, sense board 512 and/or a control circuit incorporated therein and/or communicatively connected thereto may be configured to adjust charge to at least one battery cell of the plurality of battery cells as a function of the detected parameter; this may include adjustment in charge as a function of detection of a charge reduction event. Alternatively or additionally, sense board 512 and/or a control circuit incorporated therein and/or communicatively connected thereto may be configured to increase charge to a cell upon detection that a charge reduction event has ceased; for instance, sense board 512 and/or a control circuit incorporated therein and/or communicatively connected thereto may detect that a temperature of a subject battery cell has dropped below a threshold, and may increase charge again. Charge may be regulate using any suitable means for regulation of voltage and/or current, including without limitation use of a voltage and/or current regulating component, including one that may be electrically controlled such as a transistor; transistors may include without limitation bipolar junction transistors (BJTs), field effect transistors (FETs), metal oxide field semiconductor field effect transistors (MOSFETs), and/or any other suitable transistor or similar semiconductor element. Voltage and/or current to one or more cells may alternatively or additionally be controlled by thermistor in parallel with a cell that reduces its resistance when a temperature of the cell increases, causing voltage across the cell to drop, and/or by a current shunt or other device that dissipates electrical power, for instance through a resistor.

Still referring to FIG. 5, sense board 512 may comprise a high current busbar and integral electrical connections. Sense board 512, and further the battery management system may charge individual battery cells depending on battery cell charge levels. Charging may be balanced throughout the plurality of battery cells by directing energy through balance resistors by dissipating current through resistors as heat. In this manner, battery cells may be charged evenly, for example, cells with a lower amount of electrical energy will charge more than battery cells with a greater amount of energy. Cell charge balancing may be controlled via any means described above for regulation of charge levels, including without limitation metal oxide silicon field effect transistor or a metal oxide semiconductor field effect transistor (MOSFET).

Outputs from sensors or any other component present within system may be analog or digital. Onboard or remotely located processors can convert those output signals from sensor suite to a usable form by the destination of those signals. The usable form of output signals from sensors, through processor may be either digital, analog, a combination thereof or an otherwise unstated form. Processing may be configured to trim, offset, or otherwise compensate the outputs of sensor suite. Based on sensor output, the processor can determine the output to send to downstream component. Processor can include signal amplification, operational amplifier (OpAmp), filter, digital/analog conversion, linearization circuit, current-voltage change circuits, resistance change circuits such as Wheatstone Bridge, an error compensator circuit, a combination thereof or otherwise undisclosed components.

The herein disclosed system and method may comprise a plurality of sensors in the form of individual sensors or a sensor suite working in tandem or individually. A sensor suite may include a plurality of independent sensors, as described above, where any number of the previously described sensors may be used to detect any number of physical or electrical quantities associated with an aircraft power system or an electrical energy storage system similar or identical to battery module 100. Independent sensors, as described above, may include separate sensors measuring heat energy of battery module 100 that may be powered by and/or in communication with circuits independently, where each may signal sensor output to a control circuit such as a user graphical interface. In a non-limiting example, there may be four independent sensors housed in and/or on module measuring battery module 100 or battery cell 304 for temperature, electrical characteristic such as voltage, amperage, resistance, or impedance. In an embodiment, use of a plurality of independent sensors may result in redundancy configured to employ more than one sensor that measures the same phenomenon, those sensors being of the same type, a combination of, or another type of sensor not disclosed above, so that in the event one sensor fails, the ability of aircraft and/or user to detect phenomenon is maintained and in a non-limiting example, a user alter aircraft usage pursuant to sensor readings.

Any of the disclosed systems, namely battery module 100, battery unit 316, and/or battery pack may incorporate provisions to dissipate heat energy present due to electrical resistance in integral circuit. Battery module 100 comprises one or more battery element modules wired in series and/or parallel. The presence of a voltage difference and associated amperage inevitably will increase heat energy present in and around battery module 100 as a whole. The presence of heat energy in a power system is potentially dangerous by introducing energy possibly sufficient to damage mechanical, electrical, and/or other systems present in at least a portion of exemplary aircraft 200. Battery module 100 may comprise mechanical design elements, one of ordinary skill in the art, may thermodynamically dissipate heat energy away from battery module 100. The mechanical design may include, but is not limited to, slots, fins, heat sinks, perforations, a combination thereof, or another undisclosed element.

Heat dissipation may comprise material selection beneficial to move heat energy in a suitable manner for operation of battery module 100. Certain materials with specific atomic structures and therefore specific elemental or alloyed properties and characteristics may be selected in construction of battery module 100 to transfer heat energy out of a vulnerable location or selected to withstand certain levels of heat energy output that may potentially damage an otherwise unprotected component. One of ordinary skill in the art, after reading the entirety of this disclosure would understand that material selection may comprise titanium, steel alloys, nickel, copper, nickel-copper alloys such as Monel, tantalum and tantalum alloys, tungsten and tungsten alloys such as Inconel, a combination thereof, or another undisclosed material or combination thereof.

Heat dissipation may comprise a combination of mechanical design and material selection. The responsibility of heat dissipation may fall upon the material selection and design as disclosed above in regard to any component disclosed in this paper. The battery module 100 may comprise similar or identical features and materials ascribed to battery module 100 in order to manage the heat energy produced by these systems and components.

According to embodiments, the circuitry battery module 100 may comprise, as discussed above, may be shielded from electromagnetic interference. The battery elements and associated circuitry may be shielded by material such as mylar, aluminum, copper a combination thereof, or another suitable material. The battery module 100 and associated circuitry may comprise one or more of the aforementioned materials in their inherent construction or additionally added after manufacture for the express purpose of shielding a vulnerable component. The battery assembly 300 and associated circuitry may alternatively or additionally be shielded by location. Electrochemical interference shielding by location comprises a design configured to separate a potentially vulnerable component from energy that may compromise the function of said component. The location of vulnerable component may be a physical uninterrupted distance away from an interfering energy source, or location configured to comprise a shielding element between energy source and target component. The shielding may comprise an aforementioned material in this section, a mechanical design configured to dissipate the interfering energy, and/or a combination thereof. The shielding comprising material, location and additional shielding elements may defend a vulnerable component from one or more types of energy at a single time and instance or include separate shielding for individual potentially interfering energies.

With continued reference to FIG. 5, a portion of at least a first cell retainer 520, which may be similar or the same as cell retainer 416 as described hereinabove is illustrated. A first cell retainer 520 is mechanically coupled to a first end of battery cell 504 and is configured to hold battery cell 504 fixed in a position. Cell retainer 520 comprises a structure that mechanically couple cells 504 together and mechanically couple cells 504 together in a preferred arrangement that is not illustrated in this figure for clarity. One of ordinary skill in the art would appreciate that cell retainer 520, as previously disclosed may be injection molded plastic such that its shape may comprise a plurality of holes which may correspond to and hold cells 504 in position relative to each other. FIG. 5 illustrates only the portion of cell retainer 520 that captures a portion of cell 504 and additionally a small portion of the interconnection between holes comprising cell retainer 520 illustrated by a boss or extrusion with a broken edge to imply extension beyond what is shown. Back plate 516, which is similar or the same back plate as back plate 320 is shown as a laminate, comprising more than one layer of thermally insulating material(s).

Figure 6:
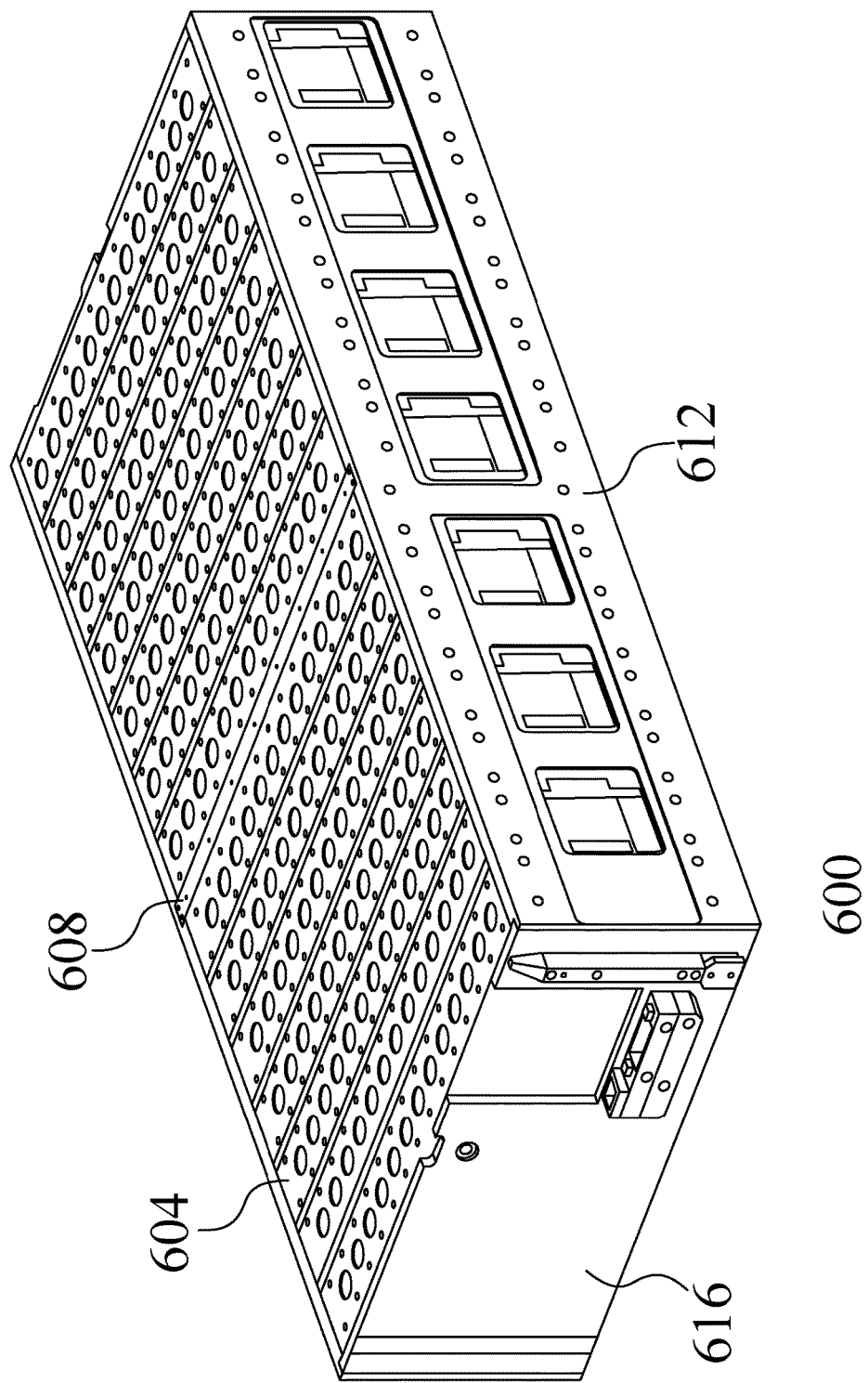
FIG. 6 is an isometric view illustrating an embodiment of a battery pack.

Referring now to FIG. 6, an exemplary embodiment of an eVTOL aircraft battery pack is illustrated. Battery pack 600 is a power source that is configured to store electrical energy in the form of a plurality of battery modules, which themselves are comprised of a plurality of electrochemical cells. These cells may utilize electrochemical cells, galvanic cells, electrolytic cells, fuel cells, flow cells, and/or voltaic cells. In general, an electrochemical cell is a device capable of generating electrical energy from chemical reactions or using electrical energy to cause chemical reactions, this disclosure will focus on the former. Voltaic or galvanic cells are electrochemical cells that generate electric current from chemical reactions, while electrolytic cells generate chemical reactions via electrolysis. In general, the term 'battery' is used as a collection of cells connected in series or parallel to each other. A battery cell may, when used in conjunction with other cells, may be electrically connected in series, in parallel or a combination of series and parallel. Series connection comprises wiring a first terminal of a first cell to a second terminal of a second cell and further configured to comprise a single conductive path for electricity to flow while maintaining the same current (measured in Amperes) through any component in the circuit. A battery cell may use the term 'wired', but one of ordinary skill in the art would appreciate that this term is synonymous with 'electrically connected', and that there are many ways to couple electrical elements like battery cells together. An example of a connector that do not comprise wires may be prefabricated terminals of a first gender that mate with a second terminal with a second gender. Battery cells may be wired in parallel. Parallel connection comprises wiring a first and second terminal of a first battery cell to a first and second terminal of a second battery cell and further configured to comprise more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high-current applications, or the like. In an exemplary embodiment, battery pack 600 comprise 196 battery cells in series and 18 battery cells in parallel. This is, as someone of ordinary skill in the art would appreciate, is only an example and battery pack 600 may be configured to have a near limitless arrangement of battery cell configurations.

With continued reference to FIG. 6, battery pack 600 comprises a plurality of battery modules 604. The battery modules may be wired together in series and in parallel. Battery pack 600 may comprise center sheet 608 which may comprise a thin barrier. The barrier may comprise a fuse connecting battery modules on either side of center sheet 608. The fuse may be disposed in or on center sheet 608 and configured to connect to an electric circuit comprising a first battery module and therefore battery unit and cells. In general, and for the purposes of this disclosure, a fuse is an electrical safety device that operate to provide overcurrent protection of an electrical circuit. As a sacrificial device, its essential component is metal wire or strip that melts when too much current flows through it, thereby interrupting energy flow. The fuse may comprise a thermal fuse, mechanical fuse, blade fuse, expulsion fuse, spark gap surge arrestor, varistor, or a combination thereof.

Battery pack 600 may also comprise a side wall 612 comprises a laminate of a plurality of layers configured to thermally insulate the plurality of battery modules 604 from external components of battery pack 600. Side wall 612 layers may comprise materials which possess characteristics suitable for thermal insulation as described in the entirety of this disclosure like fiberglass, air, iron fibers, polystyrene foam, and thin plastic films, to name a few. Side wall 612 may additionally or alternatively electrically insulate the plurality of battery modules 604 from external components of battery pack 600 and the layers of which may comprise polyvinyl chloride (PVC), glass, asbestos, rigid laminate, varnish, resin, paper, Teflon, rubber, and mechanical lamina. Center sheet 608 may be mechanically coupled to side wall 612 in any manner described in the entirety of this disclosure or otherwise undisclosed methods, alone or in combination. Side wall 612 may comprise a feature for alignment and coupling to center sheet 608. This feature may comprise a cutout, slots, holes, bosses, ridges, channels, and/or other undisclosed mechanical features, alone or in combination.

Battery pack 600 may also comprise an end panel 616 comprising a plurality of electrical connectors and further configured to fix battery pack 600 in alignment with at least a side wall 612. End panel 616 may comprise a plurality of electrical connectors of a first gender configured to electrically and mechanically couple to electrical connectors of a second gender. End panel 616 may be configured to convey electrical energy from battery cells to at least a portion of an eVTOL aircraft. Electrical energy may be configured to power at least a portion of an eVTOL aircraft or comprise signals to notify aircraft computers, personnel, users, pilots, and any others of information regarding battery health, emergencies, and/or electrical characteristics. The plurality of electrical connectors may comprise blind mate connectors, plug and socket connectors, screw terminals, ring and spade connectors, blade connectors, and/or a undisclosed type alone or in combination. The electrical connectors of which end panel 616 comprises may be configured for power and communication purposes.

A first end of end panel 616 may be configured to mechanically couple to a first end of a first side wall 612 by a snap attachment mechanism, similar to end cap and side panel configuration utilized in the battery module. To reiterate, a protrusion disposed in or on end panel 616 may be captured, at least in part, by a receptacle disposed in or on side wall 612. A second end of end panel 616 may be mechanically coupled to a second end of a second side wall 612 in a similar or the same mechanism.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
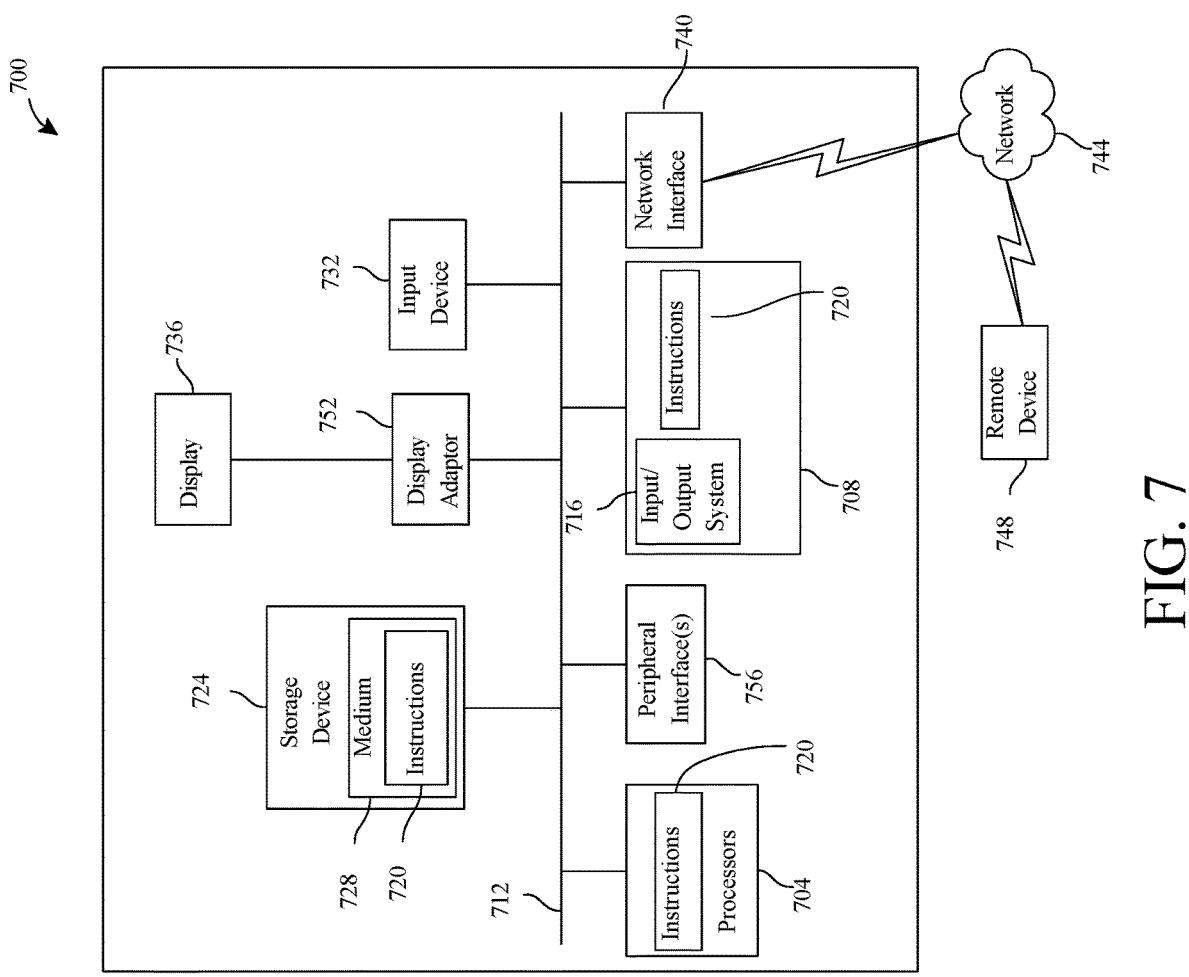
FIG. 7 is a block diagram illustrating an exemplary embodiment of a computer system.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A power source assembly for an electric vertical take-off and landing (eVTOL) aircraft comprising:
   a high energy density battery module, comprising:
      a plurality of battery units, wherein each battery unit of the plurality of battery units is electronically coupled to at least one other battery unit of the plurality of battery units and wherein each battery unit comprises:
         a plurality of battery cells;
         a cell retainer disposing the plurality of battery cells in a predetermined arrangement, wherein the predetermined arrangement comprises a first column and a second column;
         a protective wrapping looping around each battery cell comprising a single sheet of thermally insulating material, woven between at least a portion of the first column and at least a portion of the second column, configured to thermally insulate each battery cell from surrounding battery cells; and
      at least an electrical contact disposed on each of the plurality of battery units.

2. The assembly of claim 1, wherein each of the plurality of battery cells comprises a radius.

3. The assembly of claim 2, wherein the first column is offset from the second column by a distance equal to the radius.

4. The assembly of claim 1, wherein each battery unit comprises opposite, opposing sides.

5. The assembly of claim 4, wherein each battery unit is disposed within the high energy density battery module such that at least a portion of a first surface of each battery unit is in contact with at least a portion of a first surface of another battery unit.

6. The assembly of claim 1, wherein each battery unit comprises an electrical contact having an electrical connection with each battery cell of the respective battery unit.

7. The assembly of claim 1, wherein each battery unit further comprises a cell guide disposed under the cell retainer.

8. The assembly of claim 1, wherein the cell guide includes a cutout.

9. The assembly of claim 1, wherein each battery unit further comprises a sense board configured to detect a temperature of a battery cell within a respective battery unit.

10. The assembly of claim 9, wherein the sense board comprises a plurality of holes equal to a number of battery cells in a respective battery unit.

11. The assembly of claim 10, wherein the holes are disposed on the sense board according to an arrangement of each battery cell in the respective battery unit.

12. The assembly of claim 9, wherein the sense board detects a failure as a function of a detected temperature.

13. The assembly of claim 1, wherein the cell retainer comprises an injection molded component.

14. The assembly of claim 1, wherein the high energy density battery module provides energy to at least a portion of the eVTOL.

15. The assembly of claim 1, wherein each battery module further comprises a back plate and wherein at least a portion of the back plate comprises a thermally insulating material.

16. The assembly of claim 1, wherein the high energy density battery module further comprises an end cap to capture at least a portion of the battery module.

17. The assembly of claim 16, wherein the end cap comprises a non-electrically conductive component.

18. The assembly of claim 16, wherein the end cap comprises a protrusion disposed on the end cap.

19. The assembly of claim 18, wherein the protrusion is configured to mechanically couple the end cap to a side panel.

20. The assembly of claim 19, wherein the side panel forms at least a side of battery module.

* * * * *